(12) United States Patent  
Chung et al.

(10) Patent No.: US 12,547,811 B2  
(45) Date of Patent: Feb. 10, 2026

(54) METHOD FOR ROUTING OF REDISTRIBUTION LAYERS IN IC PACKAGE

(71) Applicant: AnaGlobe Technology, Inc., Hsinchu (TW)

(72) Inventors: Min-Hsuan Chung, Yunlin County (TW); Je-Wei Chuang, Hsinchu (TW); Yao-Wen Chang, Taipei (TW); Yu-Tsang Hsieh, Hsinchu County (TW)

(73) Assignee: AnaGlobe Technology, Inc., Hsinchu (TW)

( * ) Notice: Subject to any disclaimer, the term of this patent is extended or adjusted under 35 U.S.C. 154(b) by 569 days.

(21) Appl. No.: 18/104,952

(22) Filed: Feb. 2, 2023

(65) Prior Publication Data

US 2024/0265186 A1     Aug. 8, 2024

(51) Int. Cl.
*G06F 30/3947* (2020.01)
*G06F 30/3953* (2020.01)
*G06F 113/18* (2020.01)

(52) U.S. Cl.
CPC ...... *G06F 30/3947* (2020.01); *G06F 30/3953* (2020.01); *G06F 2113/18* (2020.01)

(58) Field of Classification Search
CPC .......... G06F 30/3947; G06F 30/3953; G06F 2113/18

USPC ........................................................ 716/100
See application file for complete search history.

(56) References Cited

U.S. PATENT DOCUMENTS

| | | | |
|---|---|---|---|
| 6,996,789 B2 * | 2/2006 | Teig | G06F 30/3947 716/134 |
| 8,949,762 B1 * | 2/2015 | Alpert | G06F 30/398 716/119 |
| 10,133,841 B1 * | 11/2018 | Majumder | G06F 30/398 |
| 11,361,140 B1 * | 6/2022 | Gupta | G06F 30/3953 |
| 2009/0254874 A1 * | 10/2009 | Bose | G06F 30/39 716/113 |
| 2015/0154337 A1 * | 6/2015 | Fang | G06F 30/392 716/120 |
| 2018/0032660 A1 * | 2/2018 | Lin | G06F 30/394 |
| 2018/0157782 A1 * | 6/2018 | Rossi | H01L 24/00 |
| 2021/0375681 A1 * | 12/2021 | Han | H10D 88/01 |

* cited by examiner

*Primary Examiner* — Suchin Parihar
(74) *Attorney, Agent, or Firm* — Muncy, Geissler, Olds & Lowe, P.C.

(57) ABSTRACT

A method for routing of redistribution layers in IC package is proposed, which is executed by a computer, the method comprising using the computer to perform the following: providing design rules, a set of I/O pads and bump pads and a pre-assignment netlist; performing a global routing which generates the guides for any non-acute angle RDL routing; and performing a detailed routing which adjusts the access point for shorter wirelength and finishes the routing. After the access points are located, the nets tile by tile are routed.

20 Claims, 14 Drawing Sheets

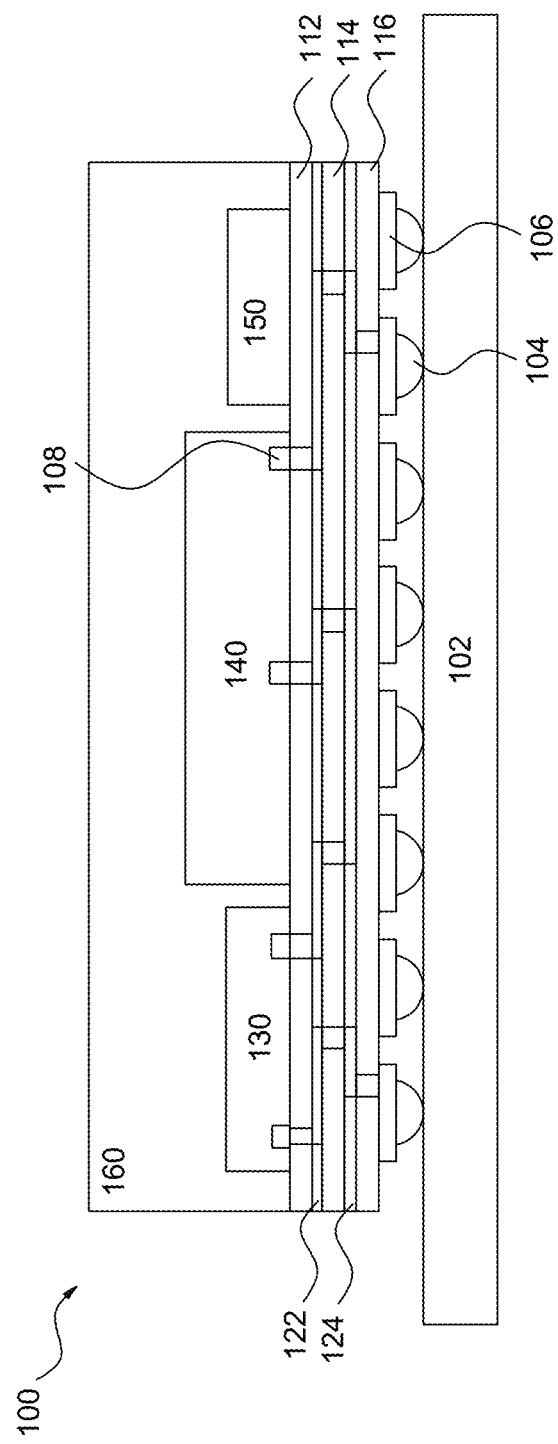

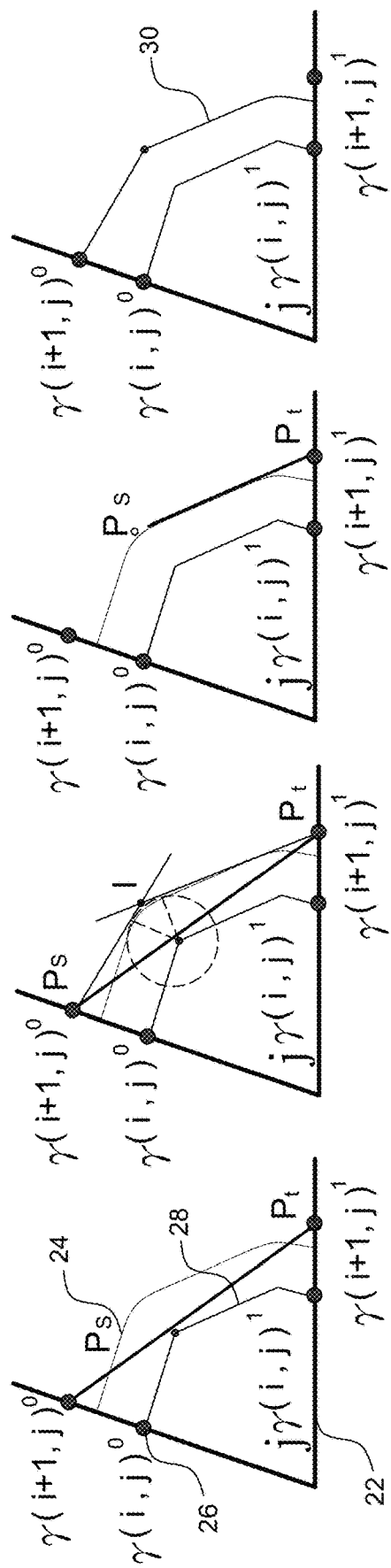

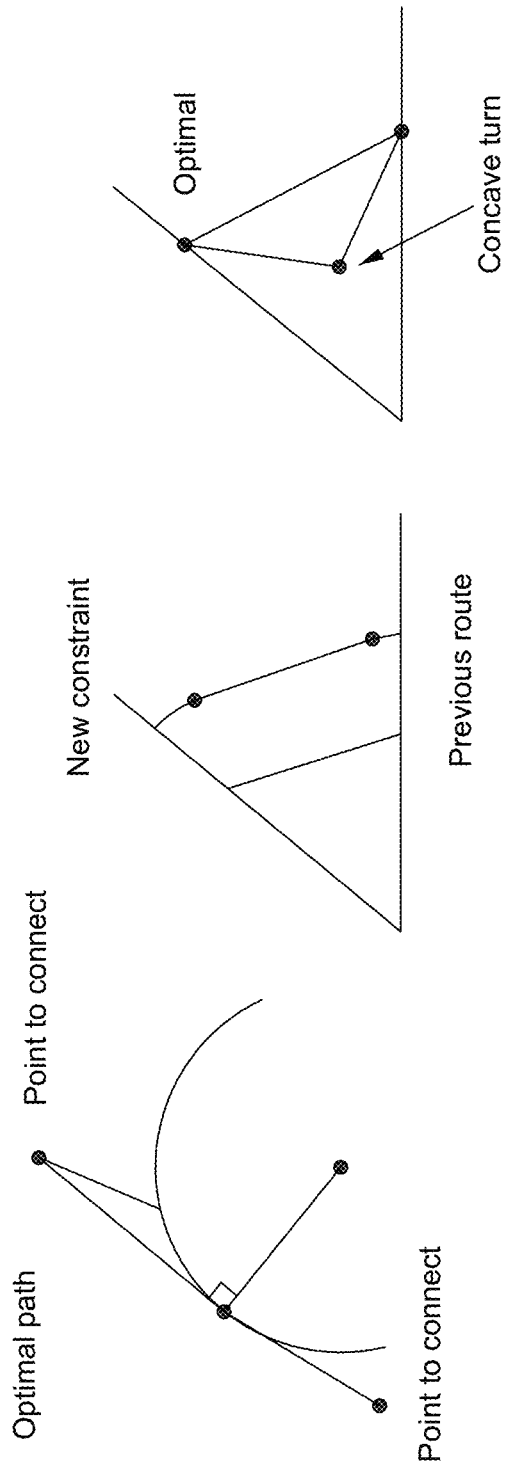

US 12,547,811 B2

METHOD FOR ROUTING OF REDISTRIBUTION LAYERS IN IC PACKAGE

TECHNICAL FIELD

The present invention relates to a routing in redistribution layers, and more particularly, to a method for routing of redistribution layers in IC package.

BACKGROUND

As the advanced process cost increases dramatically, heterogeneous integration by integrating multiple chips with mature technologies into a single package becomes promising to achieve the cost-performance optimization goal. Among existing packaging technologies, the integrated fan-out (InFO) structure shows significant advantages, including high-density interconnections, better power efficiency, and better thermal properties. In an InFO package, interconnections between different chips are realized in the redistribution layers (RDLs).

Redistribution layers (RDLs) are widely applied for signal transmissions in advanced packages. Traditional RDL routing algorithms performs routing with multiple nets. However, underestimating routing resource and over constraining solution space could reduce the solution quality of routing. As technology improved, multi-layer structures were proposed. Finding a better topology to minimize the layer used becomes important and challenging. Taking the advantages of the regular pad structure, Lin and Lin proposed a concentric circle model and solved the layer assignment problem with LCS (refer to: B.-Q. Lin, T.-C. Lin, and Y.-W. Chang, "Redistribution Layer Routing for Integrated Fan-Out Wafer-Level Chip-Scale Packages," in Proc. of ICCAD, 2016, pp. 1-8).

These previous works provide some insights into routing guide generation. However, their formulation is not for the any non-acute angle problem, and their analytical formulation cannot scale well for package routing because of its high time complexity.

SUMMARY OF THE INVENTION

In this invention, an any non-acute angle routing algorithm for multiple RDLs is proposed. The proposed design flow guarantees to generate a shorter wirelength and better routability in the congestion region.

In this invention, a method for routing of redistribution layers in IC package is proposed, which is executed by a computer, the method comprising using the computer to perform the following: providing design rules, a set of I/O pads and bump pads and a pre-assignment netlist stored in a memory for the computer; performing a routing graph construction to generate candidate vias for connections in different wire layers; performing a net order determination to find routing resource from triangular tiles, wherein the routing resource includes a plurality of nets sorted by estimated congestion through estimated guides of candidate vias nodes; performing a routing guide construction to obtain routing guides of the plurality of nets; performing an access point adjustment such that a movable range of each plurality of access points is small enough, or the plurality of access points are moved, wherein an access point represents an actual position that a net intersects with tile edges; and performing a tile routing such that the plurality of access points to be connected are all paired and located on tile boundaries.

According to one aspect, a fixed number of dummy points are uniformly inserted into the tile boundaries. The routing resource includes routing graph composed of two kinds of search nodes, via nodes and edge nodes, and three kinds of edges, cross-via edges, access-via edges and cross-tile edges. The net order determination includes a net order adjustment according to failure count of the plurality of nets.

According to another aspect, the plurality of access points are classified as fixed access points and movable access points. A user-defined number of candidate positions are evenly distributed into the movable range of each plurality of access points in the access point adjustment. A routing angle for redistribution layers is larger than or equal to 90 degrees.

In the invention, a non-transitory computer-readable medium containing instructions is proposed, which when read and executed by a computer, cause the computer to execute a method for routing of redistribution layers in IC package, wherein the method comprises the above-mentioned steps.

BRIEF DESCRIPTION OF THE DRAWINGS

The components, characteristics and advantages of the present invention may be understood by the detailed descriptions of the preferred embodiments outlined in the specification and the drawings attached:

FIG. 1 shows the side view of an InFO package.

FIG. 12A illustrates violation between $s(p_s, p_t)$ and $r(\gamma(i,j)^0, \gamma(i,j)^1)$ found.

FIG. 12B illustrates intersected point $p_i$ found.

FIG. 12C illustrates replacing $p_s$ with $p_i$.

FIG. 12D illustrates no spacing violation.

FIG. 13A illustrates tangent for a smooth boundary.

FIG. 13B illustrates constraint from the previous route.

FIG. 13C illustrates convex optimal curve.

DETAILED DESCRIPTION

Figure 2B:
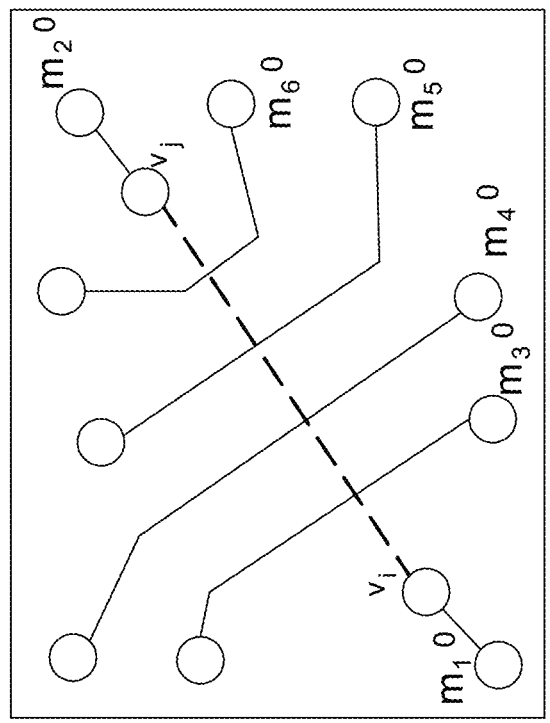
FIG. 2B shows routing result of any non-acute angle routing in a single layer.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

In this invention, routing in RDLs can be any obtuse angle, leading to larger routing solution spaces and shorter total wirelength. This invention proposes the any non-acute angle routing algorithm for multiple RDLs. First, a novel global routing algorithm is provided with accurate routing resource estimation. A multi-net access point adjustment method is then proposed based on dynamic programming and the partial net separation scheme. Finally, an efficient tile routing algorithm is developed to obtain valid routes with fixed access points. Experimental results show that the proposed algorithm can achieve a 15.7% shorter wirelength compared with a traditional RDL router. That is, experimental results have shown the effectiveness of the proposed any non-acute angle RDL routing algorithm.

FIG. 1 shows the side view of an integrated fan-out (InFO) package 100. The top part is the molding compound 160 for the physical protection of the chips 130, 140 and 150. I/O pads 108, bump pads 106 and bump balls 104 are attached for the I/O signals between the chips 130, 140 and 150 and PCB 102. Interconnections between the chips 130, 140 and 150 are implemented in RDLs. The RDLs are staggered via layers 112, 114 and 116 and wire layers 122 and 124, which are used to transmit the signals vertically and horizontally. Unlike traditional fixed-angle routing, this invention can support any obtuse angle connections in an RDL with its advanced manufacturing technology for high-end designs. As a result, any non-acute angle routers at the package level are developed because of the increasing needs in advanced heterogeneous integration manufacturing, due to its advantages with higher routability and shorter wirelength.

Figure 2A:
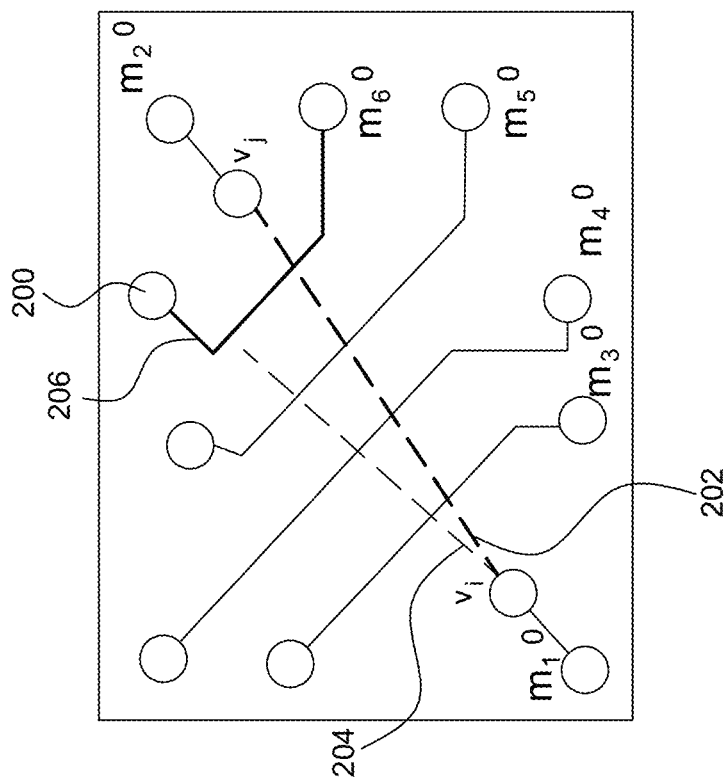
FIG. 2A shows routing result of an RDL router in a single layer.

Any non-acute angle routing provides a much larger solution space for routing considerations. With any non-acute angle routing, solutions of shorter wirelength and higher routability can be obtained because of its larger solution space. Take FIG. 2 as an example. FIG. 2 shows a routing instance that is routable for any non-acute angle routing but not feasible for traditional RDL routing. In the FIG. 2, the top wire layer is shown, where the vias pass signals to the I/O pads. Let $m_i^j$ denote the $j^{th}$ pin of net i, and $v_i$ denote the $i^{th}$ via. As shown in FIG. 2A, the channel between $v_i$ and $v_j$ cannot be fully utilized because of the fixed orientation constraint. As shown in the dotted line, the effective channel length 202 projected to the specific orientation would be shorter than the original channel length 200. On the other hand, the routes in any non-acute angle routing can be perpendicular to the channel. The route 204 is infeasible route. As shown in FIG. 2B, the perpendicular routes lead to shorter lengths on the channel and give a feasible routing solution. This example reveals the potential of any non-acute angle routing. However, as discussed, current any angle routers only work for small problem sizes because of their time-consuming and routing-resource-wasting operations. Thus, it is desirable to develop an efficient any non-acute angle routing algorithm for the advanced designs.

In this invention, the terminologies used in this invention are first given and then formulate the proposed any non-acute angle RDL routing problem.

Terminologies and Notations

The following terminologies and notations are used:
$L_v$: the via layer, which transmits signals between two adjacent wire layers.
$L_\omega$: the wire layer, which contains metal wires.
$B=\{B_i|1\le i\le |B|\}$: the set of all bump pads.
$Q=\{q_i|1\le i\le |Q|\}$: the set of all I/O pads.
$V=\{v_i|1\le i\le |V|\}$: the set of all vias.
$M=\{m_i|1\le i\le |M|\}$: the set of all nets.
$T=\{t_i|1\le i\le |T|\}$: the set of tiles constructed by the DT.
$\gamma=\{\gamma_i|1\le i\le |\Gamma|\}$: the set of all access points. Access points are the locations where nets intersect with the boundaries of tiles.
$P=\{p_i(x_i, y_i)|1\le i\le |P|\}$: the set of all points located at $(x_i, y_i)$ in the 2D plane.
$s(p_i, p_j)$: the segment that ends at $p_i$ and $p_j$.
$d(v_i, v_j)$: the distance between $v_i$ and $v_j$.
$C(p_i, rad)$: the circle with the center located at $p_i$ and radius rad.
$m_j^i$: the $j^{th}$ i/o pin of $m_i$.
$\kappa(i,j,k)$: a tile with three vertices related to $v_i$, $v_j$, and $v_k$.
$r(\gamma_i, \gamma_j)$: the detailed route connecting $\gamma_i$ and $\gamma_j$, which is a list of segments connecting the two access points.
$\omega_\omega$: the wire width.
$\omega_v$: the via width.
$\omega_s$: the minimum spacing.
$\omega_x$: the minimum turn-to-turn distance.

Any non-acute angle RDL Routing Constraints:
Spacing: Wire width and spacing between vias and wires
Non-crossing: Two nets cannot cross each other on the same layer
Routing-angle: Any turns with an angle larger than 90° are allowed
Turn-to-turn distance: Minimum turn-to-turn distance The any non-acute angle RDL routing problem with flexible vias and the following design rules are considered:
Flexible via structure: The vias in each via layer can be placed anywhere.
Minimum spacing rule: A minimum spacing is needed between any two vias or wire segments belonging to different nets.
Minimum angle constraint: Two connected segments can turn at any angle greater than or equal to 90-degree.
Minimum turn-to-turn distance: The distance between two successive turns should be larger than a fixed number for better manufacturability.

Problem Formulation:

The any non-acute angle RDL routing problem is formally defined as follows:
Problem 1 (any Non-Acute Angle RDL Routing):
Given design rules, a set of I/O pads and bump pads, and a pre-assignment netlist, connect all nets to maximize the routability and minimize the total wirelength with no design rule violation.

Figure 3:
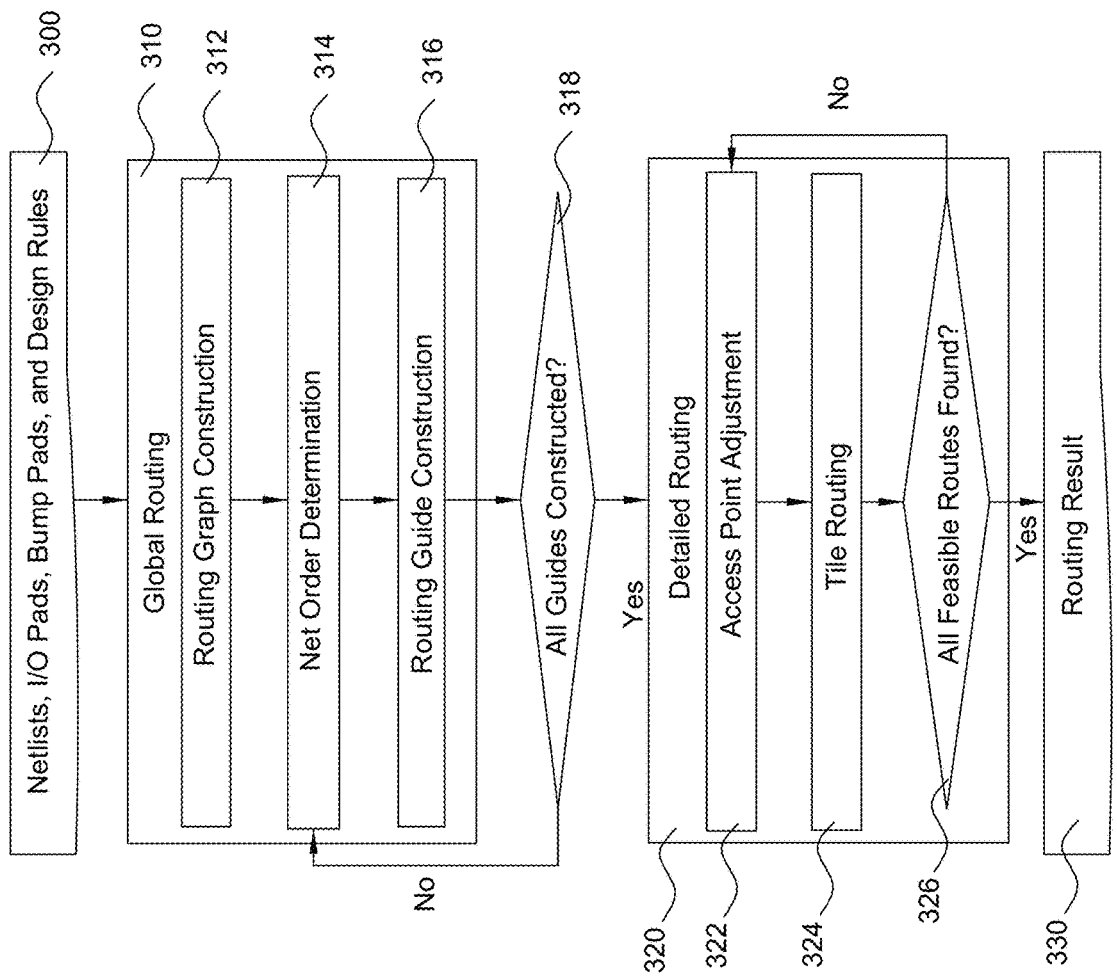
FIG. 3 shows a process flow of a method for routing of redistribution layers in IC package.

Proposed Algorithms:

In circuit design, a netlist is a description of the connectivity of an electronic circuit. In this invention, an overview of the whole algorithm flow is first given and then detail the proposed methods. As shown in FIG. 3, a schematic diagram of a method for routing of redistribution layers in IC package (such as 2.5D or 3D IC package) is described. The invention considers any non-acute angle RDL routing for multiple RDLs. FIG. 3 shows the proposed algorithm flow, which comprises two major stages: (1) Global Routing which generates the guides for any non-acute angle RDL routing, and (2) Detailed Routing which adjusts the access point for shorter wirelength and finishes the routing. An access point represents the actual position that net intersects with tile edges. In Global Routing, a multi-layer routing graph based on the via planning and the Delaunay Triangulation (DT) is first constructed. The routing resources of the triangular tiles are estimated to determine the initial net order based on the routing graph. When some routing guides fail to be generated, the net order is adjusted until all guides are generated successfully. In Detailed Routing, the dynamic programming-based single net access point adjustment is modified to determine the initial access point location. After the access points are located, the nets tile by tile are routed. These two stages will be detailed in the following.

Firstly, in step 300, design rules, a set of I/O pads and bump pads, and a pre-assignment netlist, are given. For example, the netlist may be described in a Simulation Program with Integrated Circuit Emphasis (SPICE) format, and the design constraints are annotated into the netlist. In circuit design, a netlist is a description of the connectivity of an electronic circuit.

Global Routing:

Next, in step 310, global routing is performed. In this stage, a routing graph is first constructed in step 312, then the initial net order is determined by the routing resource from the triangular tiles in step 314. Finally, non-crossing guides are obtained by maintaining the net-sequence lists and blocking the infeasible searing nodes in step 316 (please refer to: Y.-J. Cai, Y. Hsu, and Y.-W. Chang, "Simultaneous Pre- and Free-Assignment Routing for Multiple Redistribution Layers with Irregular Vias," in Proc. of DAC, 2021, pp. 1147-1152).

Figure 4B:
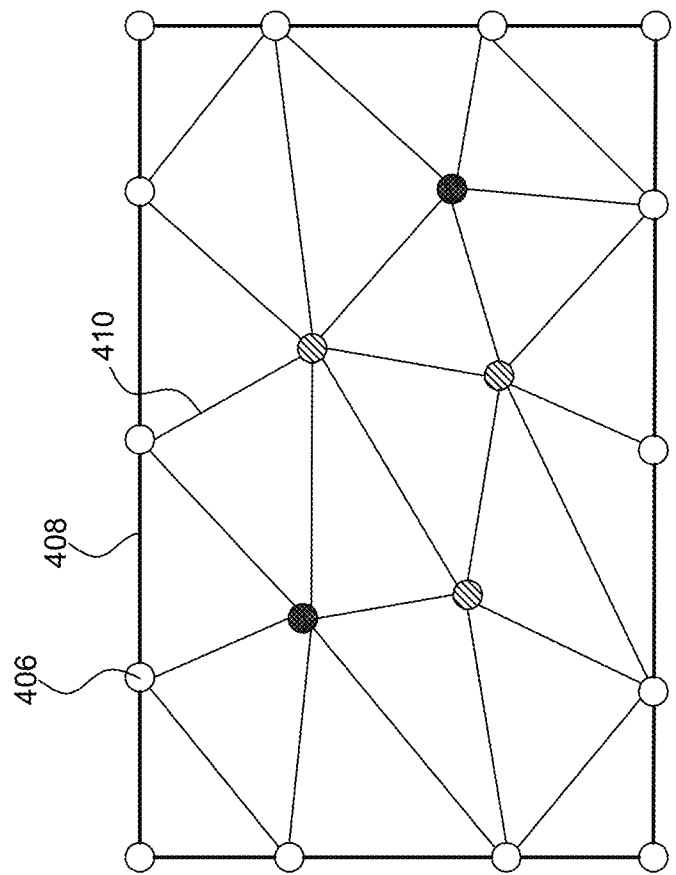
FIG. 4B shows tile partitioning result of FIG. 4A.
Figure 4A:
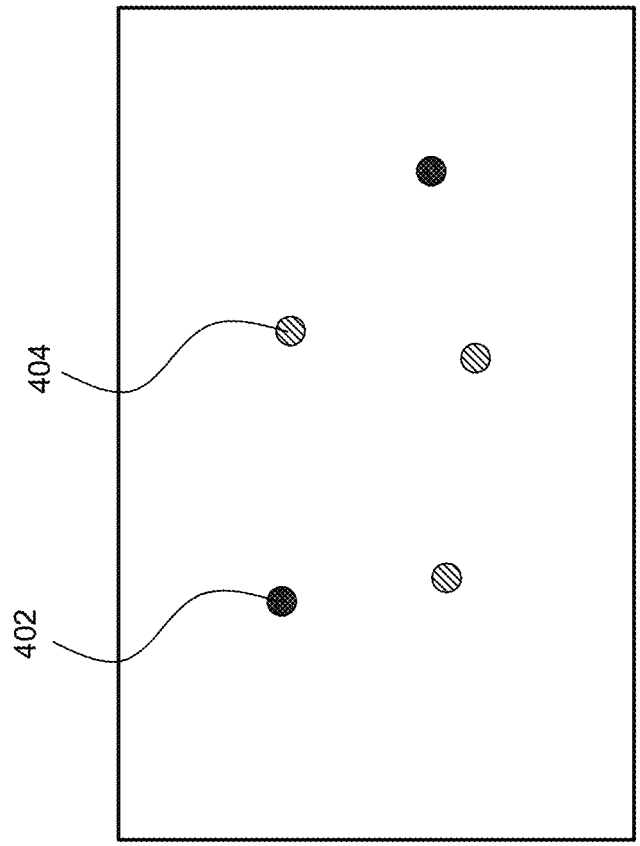
FIG. 4A shows top view of via planning in a wire layer.

Routing Graph Construction:

In the step 312, the routing graph construction is performed. The via planning algorithm is first adopted to generate the candidate vias for connections in different wire layers. As shown in FIG. 4, we perform DT with all candidate vias connected to the wire layer as the input vertices. The candidate vias include candidate upward vias 404 and candidate downward vias 402. The candidate vias are distributed averagely by user-defined parameter and input location. In addition, to obtain more balanced triangulation results, a fixed number of dummy points 406 are uniformly inserted into the layout boundary 408 of the outline. Dummy points 406 locate on the boundaries for a more uniform tile partition. Tile boundary 410 is within the layout boundary 408.

Figure 5B:
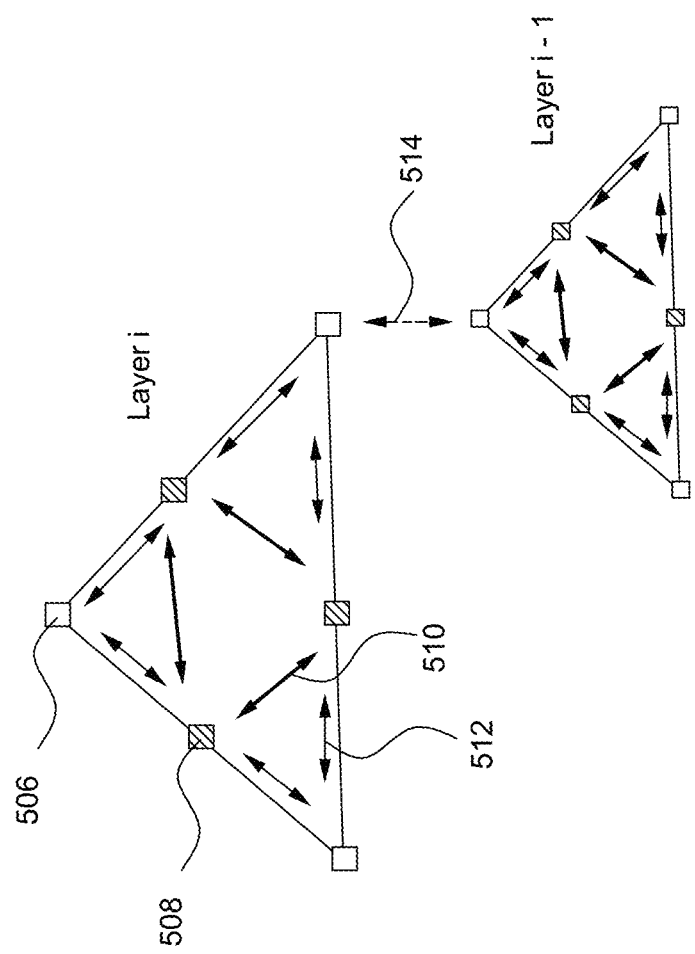
FIG. 5B shows the corresponding routing graph representation of FIG. 5A.
Figure 5A:
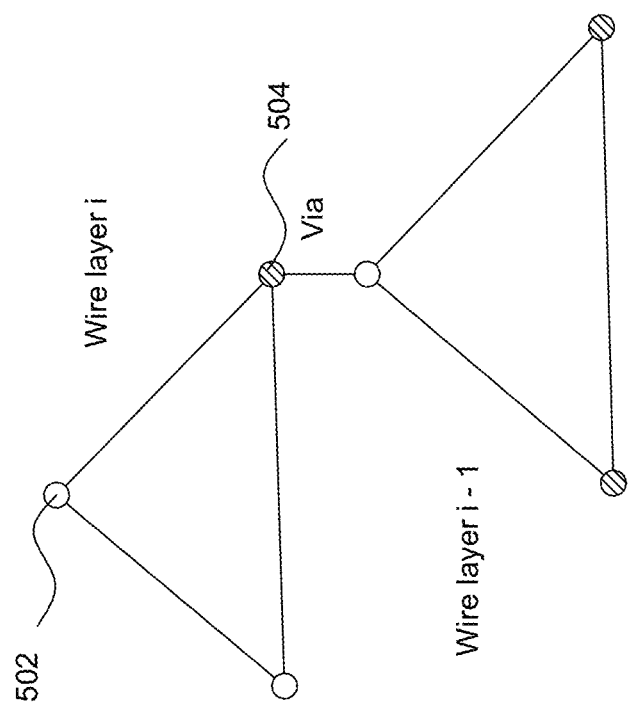
FIG. 5A shows the triangular tiles in two adjacent wire layers.

With the triangular tiles, a routing graph is constructed, as shown in FIG. 5. The proposed routing graph is composed of two kinds of search nodes: via nodes ($N_v^i$) and edge nodes ($N_e^{i,j}$), and three kinds of edges: cross-via edges ($E_v(i,j)$) 510, access-via edges ($E_a(i,j,k)$) 512, and cross-tile edges ($E_t(i,j,k)$) 514. The candidate vias include candidate upward vias 502 and candidate downward vias 504. A via node 506 is a node with capacity one, which is used to model a candidate via. An edge node 508 is a node used to model the edge segment between two candidate vias ($v_i$, $v_j$) in a tile, and its capacity is computed as follows:

$$C_{i,j} = \left[ d(v_i, v_j)/(\omega_\omega + \omega_s) \right] \quad (1)$$

where $C_{i,j}$ is the capacity of $N_e^{i,j}$.

A cross-via edge 510 is an edge with capacity one, representing the connection between two via nodes in different layers. An access-via edge 512 is an edge also with capacity one, which connects a via node and an edge node.

Figure 6B:
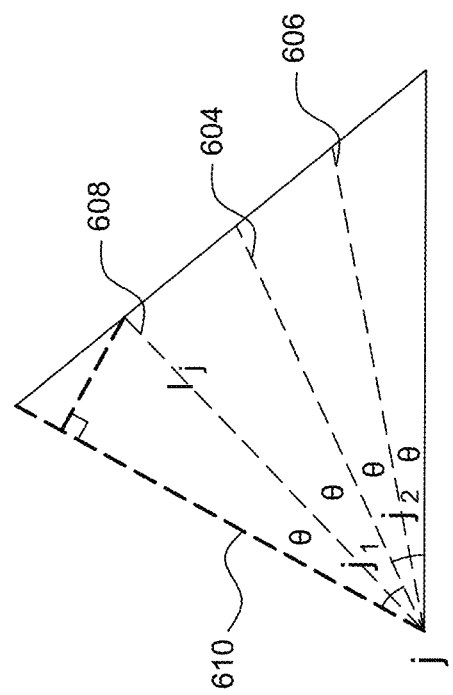
FIG. 6B shows an effective length $l_j$ of corner j.
Figure 6A:
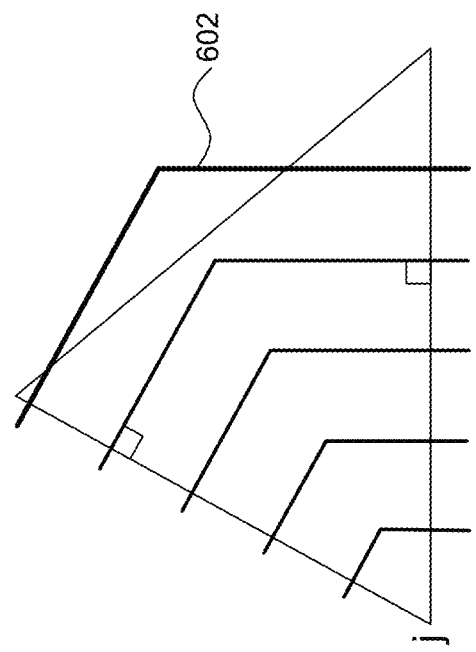
FIG. 6A shows a capacity violation in corner j.

A cross-tile edge 514 connects two edge nodes, which models the route along one corner of a tile. Spacing violations would occur when too many guides pass through an edge node pair ($N_e^i$, $N_e^j$), even when both capacities of $N_e^i$ and $N_e^j$ are not violated. As shown in FIG. 6A, a spacing violation occurs because the edge node capacity of a corner overestimates the guide number passing through the corner. An infeasible route 602 occurs. For the balance between $\omega_x$ and the capacity of a tile corner j, we use a 3-segment routing pattern to estimate the capacity. As in FIG. 6B, to better utilize the resource in a tile edge, the pattern uses two segments perpendicular to the tile edge first. Then, the corner j is separated into two corners, $j_1$ and $j_2$, by the bisector 604 of the corner j. The two corners, $j_1$ and $j_2$, have the corresponding bisector 606 and 608, respectively. Projection 610 of the bisector 608 of the corner $j_1$ is found. As shown in FIG. 6B, the shorter bisector length between $j_1$ and $j_2$ is defined as the effective length lj of the corner j. Then, the capacity of a cross-tile edge e with corner j is defined as follows:

$$C^e = \left[ \cos\left(\frac{ang(j)}{4}\right) \times l(j)/(\omega_\omega + \omega_s) \right] \quad (2)$$

where ang(j) is the angle of the corner j.

Because the capacities of a tile edge and a tile corner are treated separately, the graph model estimates the capacity with only little resource overhead. By implementing edge nodes and cross-tile edges, the tile with balanced usage of the three cross-tile edges can be fully utilized approximately, which is desirable for the congested region.

Net Order Determination:

In step 314, net order determination is performed.

Figure 7:
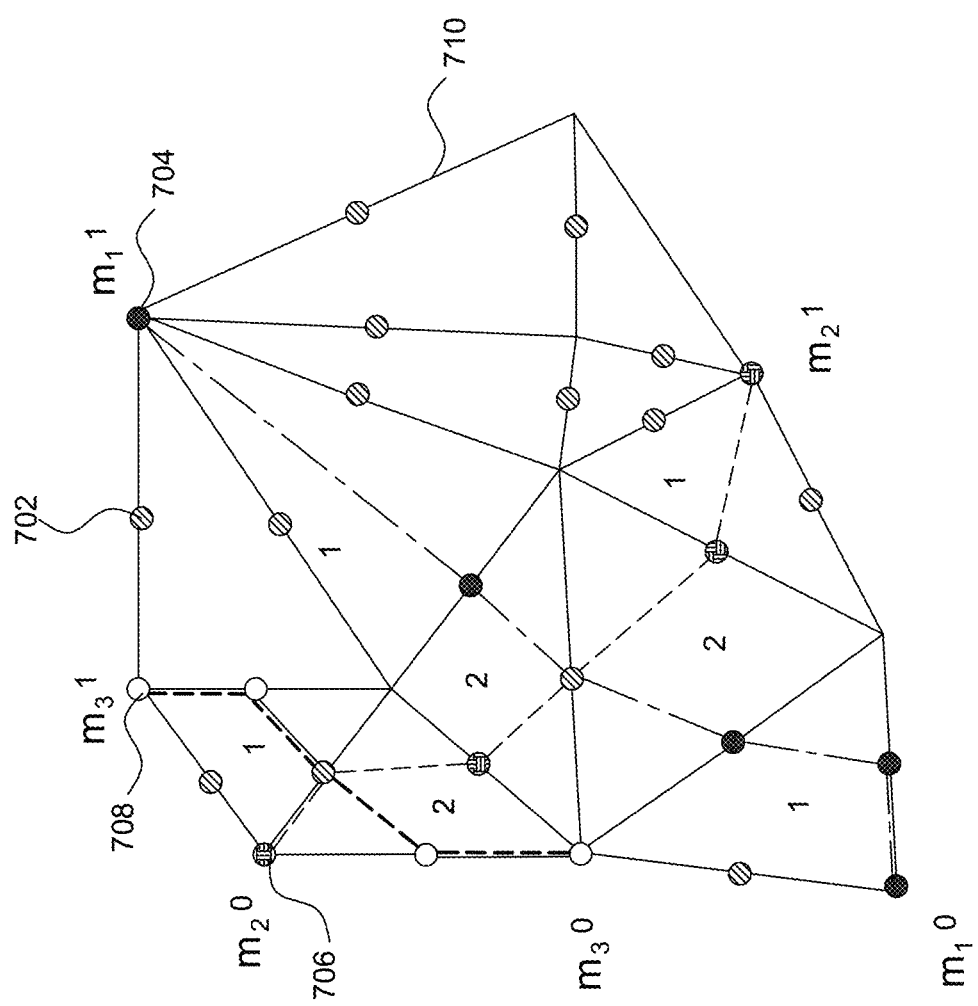
FIG. 7 illustrates an initial net ordering determination.

To avoid the routing guide congestion, the initial net order is determined by the following estimation method. Tile congestion estimation is made. First, the routing guides for each net are generated without considering others. When a guide is generated, a Rectangular Uniform Wire Density (RUDY)-like wire density estimation method is applied, and the estimated wire cost is distributed to the tiles nearby (please refer to: P. Spindler and F. M. Johannes, "Fast and Accurate Routing Demand Estimation for Efficient Routability-Driven Placement" in Proc. of DATE, 2007, pp. 1-6). After all guides are generated, the congestion cost of each tile is computed by the sum of wire density caused by all nets. As shown in FIG. 7, a simple example of the congestion cost in each tile is given. It shows an initial net ordering determination. Selected nodes 704, 706 and 708 respectively corresponding to estimated guides 1, 2 and 3 locate on the tile boundary 710. Midpoint 702 of each tile edge also locates on the tile boundary 710. Then, all guides are traced and the number of tiles with congestion costs higher than a user-defined value is recorded. When the user-defined threshold is given, the congestion cost of each guide can be obtained by the number of passing tiles with a congestion cost higher than the threshold. Take guide 1 as an example; when it starts from m° to ml, the congestion cost of tiles guide 1 passed are 1, 2, 2, and 1 separately. Hence, when the user-defined threshold is 1.5, the number of congested tiles of guide 1 is 2. Then, the overall congested cost of each guide is computed by the number of congested tiles and the number of total tiles it passes. After all guides are traversed, the net order by the number of congested tiles and the Euclidean distance of the two pins are adjusted. The net with more congested tiles and shorter Euclidean distance would be routed first. Nets are sorted by estimated congestion through the estimated guides of vias nodes.

Routing Guide Construction:

In step 316, routing guide construction is performed.

Apply A* search algorithm to obtain routing guides of all nets.

Adjust the net order if some routing guides failed to be obtained.

Check the feasibility of each candidate routing vertex: capacity check, topology check and via spacing check.

Figure 8:
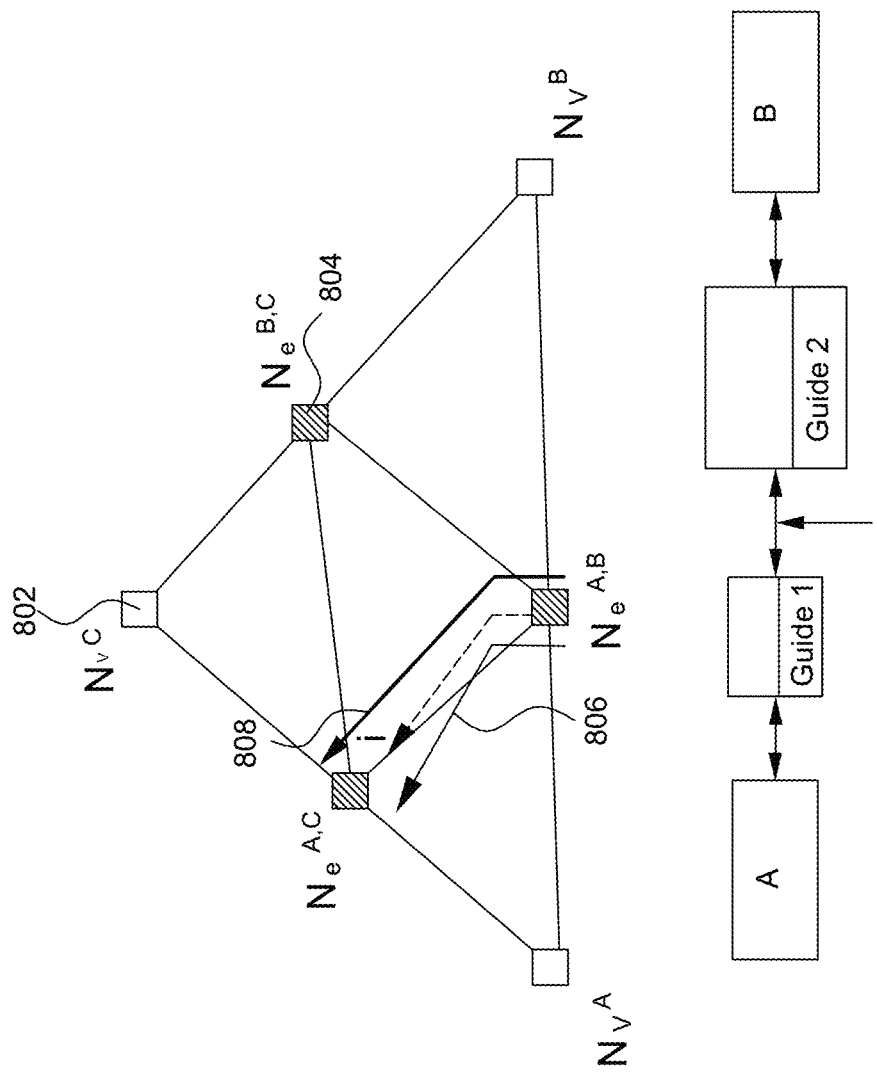
FIG. 8 illustrates an infeasible searching node blockage.
Figure 9B:
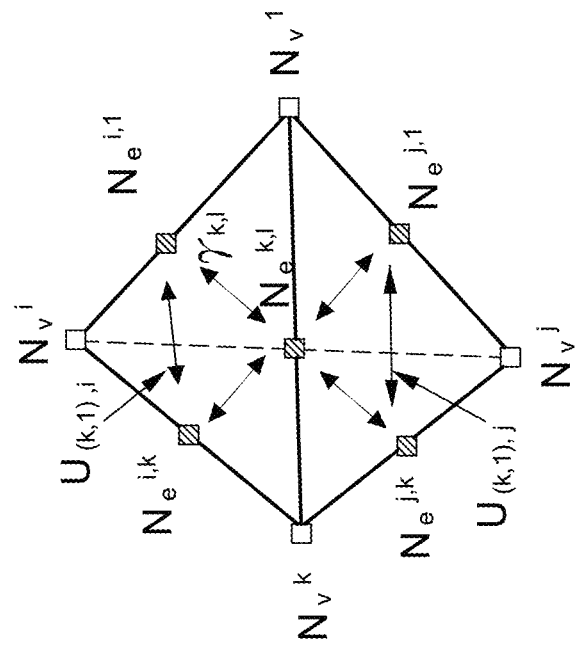
FIG. 9B illustrates a utility to be checked for the refinement.
Figure 9A:
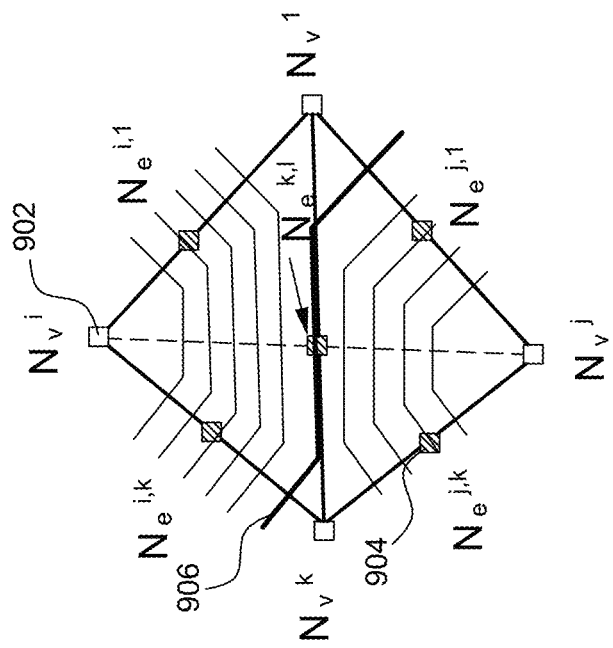
FIG. 9A illustrates an overflow of the diagonal capacity.

The routing guides are generated by crossing-aware A*-search with capacity checking. After all guides are generated, diagonal utility refinement is applied to ensure the validity of the generated guides. If some guides fail to be generated, the net order is adjusted and the guides with the adjusted order are regenerated. The three steps are detailed as follows:

a) Crossing-Aware A*-Search:

A net-sequence list in each edge node 804 is maintained to avoid the topological crossing between any two guides. Via nodes 802 locate at the corner. Since crossing between two guides always leads to a net sequence with the wrong order on the boundary of some tile, maintaining the guides with the correct order of a net sequence on the boundary of all tiles gives a non-crossing guide topology. The left and right guides next to the processing guide in each searched $N_e^{i,j}$ is recorded and the invalid nodes by the two nearby guides are blocked. As shown in FIG. 8, when searching for the next candidate node of guide i, the valid searching node remaining is only $N_e^{A,C}$ because both guide 806 (guide 1) and guide 808 (guide 2) connect to $N_e^{A,C}$. By tracing the destination of the adjacent guides, the searching nodes with crossing are blocked.

b) Diagonal Utility Refinement:

Since the number of guides between $N_v^i$ and $N_v^j$ is bounded by $d(v_i, v_j)$, the diagonal utility refinement is performed to remove infeasible guides. As shown in FIG. 9A, the number of routes passing $N_v^i$ and $N_v^j$ is bounded by $d(v_i, v_j)$. Via nodes 902 locate at the corner. The route 906 is infeasible even when the capacities of $E_r(i,k,l)$ and $E_r(j,k,l)$ are not violated. To eliminate the violation, the usage of the cross-tile edges around the edge nodes 904 is examined. As shown in FIG. 9B, the diagonal utility constraint $D_{k,l}$ of $N_e^{k,l}$ is defined as follows:

$$(U_{(k,l)i} + U_{(k,l)j} + \gamma_{k,l} + 1) \times (\omega_\omega + \omega_s) < d(vi, vj) \quad (3)$$

where both $\kappa(k,l,i) \in T$ and $\kappa(k,l,j) \in T$, $U_{(k,l),i}$ is the number of guides between $N_v^i$ and $N_e^{k,l}$, and $\gamma_{k,l}$ is the number of guides passing through $N_e^{k,l}$. When the diagonal capacity constraint $D_{k,l}$ is violated, the capacity of $N_e^{k,l}$ is reduced and the nets passing through $N_e^{k,l}$ are rerouted until there is no diagonal utility violation.

c) Net Order Adjustment:

When some guides fail to be generated, all routed guides are ripped up and the failure count of each net is updated. Based on the failure count in each net, the net order is updated by moving the nets with larger failure counts to the front. After the net order adjustment, the routing guides are constructed with the updated order until all guides are generated. Since the guides in the proposed routing algorithm should be non-crossing, the invention's adjustment procedure could be more effective than the negotiation-based rip-up and reroute (NRR) mechanism in some cases (please refer to: M. A. Zapletina, D. A. Zheleznikov, and S. V. Gavrilov, "Improving Pathfinder Algorithm Performance for FPGA Routing," in *Proc. of IEEE ElConRusNW*, 2021, pp. 2054-2057). A pin is surrounded by routes from other nets. If no overflow occurs in the surrounding tiles, the NRR gives the same result in every iteration. In contrast, the proposed adjustment procedure would change the order according to the failure count of the nets, providing the desired routes under the circumstance.

After the step 316 of routing guide construction is finished, it checks whether all guides are constructed or not. When all guides are constructed, the detailed routing process is proceeded; if not, back to the step 314.

Detailed Routing:

In the following, the detailed routing 320 is performed.

After the feasible guides are generated, the access points are evenly distributed onto the belonging tile edges. Starting from the initial location, the access points are moved to further reduce the total wirelength. Finally, the tile routing is performed to finish the route after the locations of all access points are determined.

Access Point Adjustment:

In step 322, access point adjustment is performed.

Move access points on routing guides to reduce wirelength.

Split nets into partial nets by movable region.

Sort partial nets with the number of continuous sparse access points.

Figure 10:
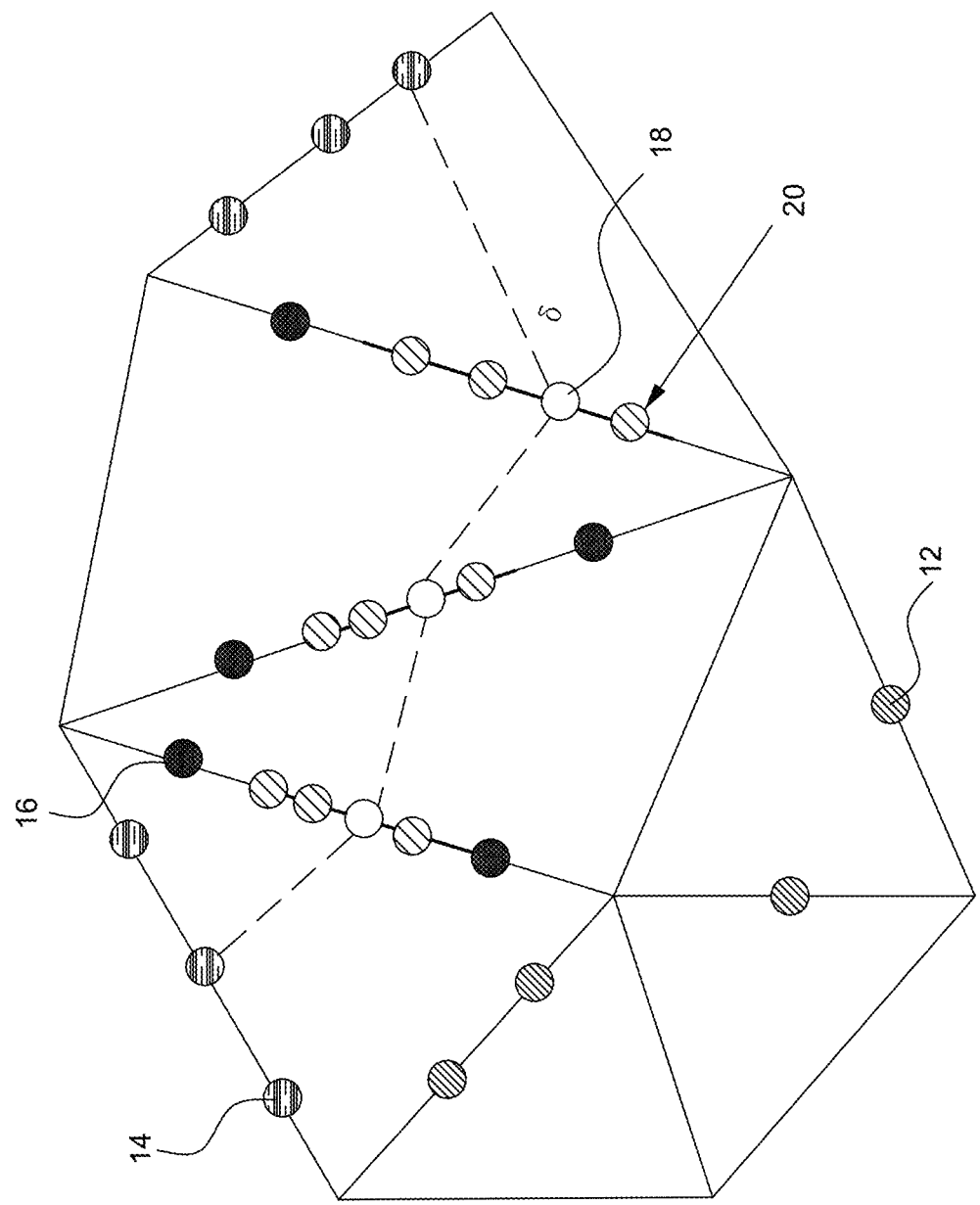
FIG. 10 illustrates update after the adjustment of $\delta$.

To allocate the routing resources of the tile edges, the movable range of each access point is computed. The access points are further classified as fixed access points 14 and movable access points 12 by the length of the movable range, as shown in FIG. 10. To speed up the adjustment process, the original nets are separated into partial nets. We define the partial net ($\delta_j^i$) as the $j^{th}$ longest access point list of $n_i$ with consecutive movable access points, and the length of a partial net $\delta$ is the number of access points 18 in it, denoted by leng($\delta$). The locations of the access points are adjusted by the dynamic programming-based method (please refer to: K. Yang, H. Yao, T.-Y. Ho, K. Xin, and Y. Cai, "AARF: Any-Angle Routing for Flow-Based Microfluidic Biochips," IEEE TCAD, vol. 37, no. 12, pp. 3042-3055, 2018). Since the length of the partial net with a larger number of access points is more likely to be reduced, the longest partial net ($\delta$') is adjusted first. In each adjustment procedure, a user-defined number of candidate positions 20 are evenly distributed into the movable range of all access points in $\delta$'. The dynamic programming algorithm gives the shortest solution of the partial net $\delta$'. After the locations of access points in a $\delta$' are determined, the movable range of every access point adjacent to $\delta$' could be updated by a single traversal through $\delta$'. With a maximum heap recording all partial nets, the partial nets can be incrementally updated in the adjustment procedure. As shown in FIG. 10, when partial net $\delta$ is processed, only five adjacent access points 16 need to be updated. The access point adjustment iterates until the movable range of all access points are small enough, or all access points are moved.

The adjustment of $\delta$ takes O(leng($\delta$)) time in the dynamic programming stage. After adjusting $\delta$, at most leng($\delta$) heap keys of partial nets need to be modified. Since changing a key in the partial net heap requires less than O(|Γ|) time, where Γ is the total number of access points, the key update after each adjustment is in O(leng($\delta$)(lg(|Γ|)) time. Since each access point is moved only once, the total length of the modified partial nets is O(|Γ|). Thus, the overall complexity of the access point adjustment is O(|Γ|lg(|Γ|)). Thus, the following theorem is obtained. Theorem 1: The time complexity of the access point adjustment is $O(|\Gamma|\lg(|\Gamma|))$, where $\Gamma$ is the total number of access points.
Tile Routing:

In step 324, tile routing is performed.

Finish the tile routing with fixed access points corner by corner.

Route access points from the outmost along the corner.

Check only the outmost route along the corner.

Figure 11A:
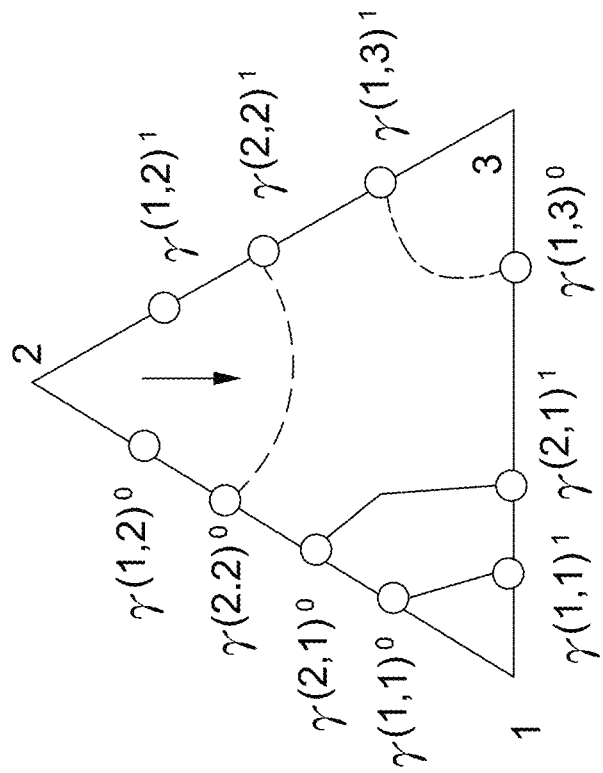
FIG. 11A illustrates routing order in the beginning.
Figure 11B:
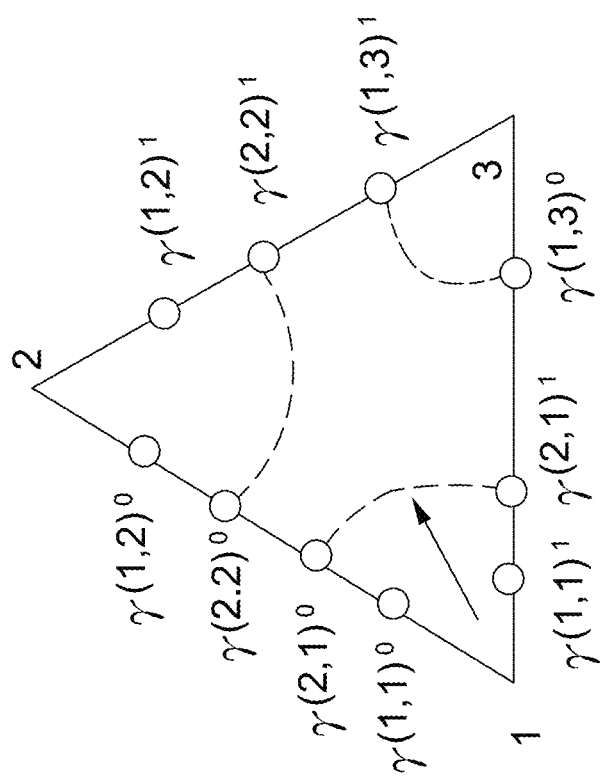
FIG. 11B illustrates routing order after $\Gamma(1)$ is routed.

After the locations of all access points are determined, the remaining detailed routing tile by tile is finished. In this stage, the access points to be connected are all paired and located on the processing tile boundaries. For every pair of access points on the same tile, the connected corner via $v_j$ is defined as the corner node ($N_j^c$) of the access point pair. We define $\gamma(i, j)=(\gamma(i,j)^0, \gamma(i,j)^1)$ as the $i^{th}$ access point pair from $N_j^c$, where an access point pair is a pair of two access points belonging to the same net, and $\Gamma(j)$ is the set of all $\gamma(i,j)$. The two-stage tile routing process is introduced as follows.
First Stage: Routing Order Determination The net order in the clockwise order of the tile corners is determined. For routing nets in corner j, $\gamma(i,j)$ after $\gamma(k,j)$ is routed if k<i. As shown in FIG. 11A, the $\gamma(1, 1)$ is routed before $\gamma(2, 1)$. After all access point pairs in $\Gamma(j)$ are routed, the nets in another corner are routed until all routes are finished. As shown in FIG. 11B, the nets in corner 2 are routed after all routes in corner 1 are finished. In this routing order, when some spacing violations exists between $r(\gamma(i,j)^0, \gamma(i,j)^1)$ and $r(\gamma(i+k,j)^0, \gamma(i+k,j)^1)$, some spacing violations must exist between $r(\gamma(i+k-1, j)^0, \gamma(i+k-1, j)^1)$ and $r(\gamma(i+k, j)^0, \gamma(i+k, j)^1)$. Thus, the outermost route of each corner is recorded, and then the subsequent spacing constraint checking would be more efficient than the unordered cases.
Second stage: Fit Routing In this stage, a process is first given to obtain a legal solution. Then, it shows that the result is a good approximation of the optimal solution with no minimum turn-to-turn constraint S. To route the access point 26 pair $\gamma(i+1, j)$, two access points are initialized, source ($p_s$), and target ($p_t$), by the locations of $\gamma(i+1,j)^0$ and $\gamma(i+1, j)^1$, respectively. Traverse the tile boundary 22 of constrained region 24 until target reached. Once $s(p_s, p_t)$ violates any spacing constraint with $r(\gamma(i,j)^0, \gamma(i,j)^1)$, as shown in FIG. 12A, the constrained circle, which is the circle centered at a point in the previous route 28 that causes the violation, $O(p_c, \omega_\omega+\omega_s)$ can be obtained by a traversal in $r(\gamma(i,j)^0, \gamma(i,j)^1)$. To solve the violation, we find the intersected point I of the following two tangent lines of $O(p_c, \omega_\omega+\omega_s)$ is found that pass through: $p_s$ and $p_t$, as shown in FIG. 12B. Then, $p_s$ is replaced by I, and the process iterates until $s(p_s, p_t)$ incurs no spacing violation with $r(\gamma(i,j)^0, \gamma(i,j)^1)$. As shown in FIGS. 12C and 12D, the routing result 330 is obtained when there is no spacing violation. That is, when all feasible routes are found in step 326, the routing result 330 is obtained. Final route 30 is found. When there is spacing violation, the procedure backs to the step 322 because all feasible routes are not found. Some lemmas are needed to show the relationship between the solution obtained and S.

Lemma 1: Given a smooth (with derivatives continuous everywhere) constraint boundary and a pair of points to be connected, connections not on the boundary should be segments and connections on the boundary should be its tangent lines for an optimal solution.

Proof 1: As shown in FIG. 13A, if the connection not on the boundary is not straight, we can always use a segment to make the wirelength shorter. The case that the connection is on the boundary works similarly.

Lemma 2: If routed from the corner to the middle of the tile sequentially, the constraints generated in each stage can only consist of segments and arcs.

Proof 2: First, from Lemma 1, as shown in FIG. 13B, if the constraint is smooth and contains only segments and arcs, the route constructed will be smooth and contain only segments and arcs. Next, the only constraint for the innermost net is generated from the corner via, which is an arc. Thus, the resulting corner pattern will contain only segments and arcs. Finally, since the constraints generated by segments are segments and the constraints generated by arcs are arcs, the constraint generated will also be smooth and contain only segments and arcs. From the discussion above and mathematical induction, the lemma holds.

Theorem 2: Constructing nets from the corner to the middle of the tile greedily gives S for the corner.

Proof 2: To prove the theorem, it only needs to show that the proposed solution for each net is the same as the solution when considering only constraints generated by access points and vias. First, it is clear that all constraint arcs are generated by access points or vias. Thus, the constraint segments generated by existing routes can only be segments with both ends being part of arcs. Next, the optimal solution of a net is considered only dealing with constraints generated by access points and vias. The region formed by the solution curve and tile edges must be convex. If not, it can always replace the concave turn with a segment, as shown in FIG. 13C. For a segment with both ends in a convex region, the whole line must be in the region by definition. From the discussion above, the constraint generated by existing routes will not affect the optimal solution since both of its ends are in the region formed by the solution curve and tile edges. Thus, the theorem holds.

Back to the construction process, it can be observed that the process tries to approximate S by replacing arcs with segments, which leads to the desired solution quality.

Since each spacing violation to a point on the previous route can be solved by the intersected point finding procedure, the increment of segment number between adjacent routes is at most one. Let $r_i$ be the $i^{th}$ route from the corner. From the discussion above, $r_i$ contains at most (i+1) segments. Constructing route $r_i$ only needs a single traversal of route $r_i-1$. Thus, constructing $r_i$ need at most i checks, and the overall time complexity of the tile routing for a single tile is $O(\Sigma_{i=1}^k i)=O(k^2)$, where k is the number of access points in the tile. When some routes fail to be generated, it enlarges the distance that needs to be kept and iterate the detailed routing. Theorem 3: The time complexity of the tile routing for a single tile is $O(k^2)$, where k is the number of access points in the tile.

EXPERIMENTAL RESULTS

The proposed any non-acute angle RDL router is implemented in the C++ programming language on a 2.9 GHz AMD Ryzen 3990X Processor with 126 GB memory. In the global routing, we used the open-source CDT package for the triangulation (C++ *Library for Generating Constraint or Conforming Delaunay Triangulations*, 2018. [Online]. Available: https://www.github.com/artem-ogre/CDT). We performed experiments on the RDL circuit benchmark used in Proc. of DAC, 2021, pp. 1147-1152 (Y.-J. Cai, Y. Hsu, and Y.-W. Chang). The benchmark contains five dense designs, and the statistics are given in Table I (benchmark statistics), where "#Chips", |IO|, |B|, |N|, and |L_ω| denote the number of chips, I/O pads, bumps, nets, and wire layers, respectively. For fair comparisons, the runtime of all cases is limited to an hour. The unfinished cases were stopped, and the results with the best routability were reported as the routing results.

TABLE I

| Circuit | #Chips | |IO| | |B| | |N| | $|L_w|$ |
|---|---|---|---|---|---|
| dense1 | 2 | 44 | 324 | 22 | 2 |
| dense2 | 3 | 92 | 784 | 46 | 2 |
| dense3 | 5 | 158 | 158 | 70 | 3 |
| dense4 | 6 | 222 | 684 | 111 | 3 |
| dense5 | 9 | 522 | 222 | 261 | 4 |

To evaluate the effectiveness of our algorithm, we compared it with the state-of-the-art any-angle router (K. Yang, H. Yao, T.-Y. Ho, K. Xin, and Y. Cai) and a recent traditional RDL router (Y.-J. Cai, Y. Hsu, and Y.-W. Chang). Since AARF only works for the single-layer structure, we re-implemented the algorithm with some extensions for the multi-layer RDL structure, namely AARF*. The result of the traditional RDL, named Cai, is derived from the paper of Y.-J. Cai, Y. Hsu, and Y.-W. Chang, directly. The experimental results are listed in Table II and Table III for comparison with the traditional RDL router and the art any-angle router, respectively. The routability, wirelength, and runtime are reported. For the cases with routability smaller than 100%, the summation of the wirelength in the successfully routed nets is reported, and the notation ">" means just a lower bound.

TABLE II

| | Routability (%) | | Wirelength (μm) | | Runtime (s) | |
|---|---|---|---|---|---|---|
| Case | Cai | Ours | Cai | Ours | Cai | Ours |
| dense1 | 100 | 100 | 86695 | 74640 | 0.79 | 0.415 |
| dense2 | 100 | 100 | 236269 | 206451 | 0.60 | 0.703 |
| dense3 | 100 | 100 | 258172 | 222601 | 3.92 | 3.68 |
| dense4 | 100 | 100 | 512619 | 461725 | 9.13 | 23.3 |
| dense5 | 100 | 100 | 1835410 | 1512849 | 12.5 | 180.07 |
| Comp. | 1 | 1 | 1.157 | 1 | 0.85 | 1 |

TABLE III

| | Routability (%) | | Wirelength (μm) | | Runtime (s) | |
|---|---|---|---|---|---|---|
| Case | AARF* | Ours | AARF* | Ours | AARF* | Ours |
| dense1 | 100 | 100 | 79525 | 74640 | 6.29 | 0.415 |
| dense2 | 86.9565 | 100 | >195880 | 206451 | 3600 | 0.703 |
| dense3 | 88.6076 | 100 | >210798 | 222601 | 3600 | 3.68 |
| dense4 | 83.7838 | 100 | >408987 | 461725 | 3600 | 23.3 |
| dense5 | 75.8621 | 100 | >1081270 | 1512849 | 3600 | 180.07 |
| Comp. | 87.042 | 1 | — | 1 | 1257.77 | 1 |

Figure 14:
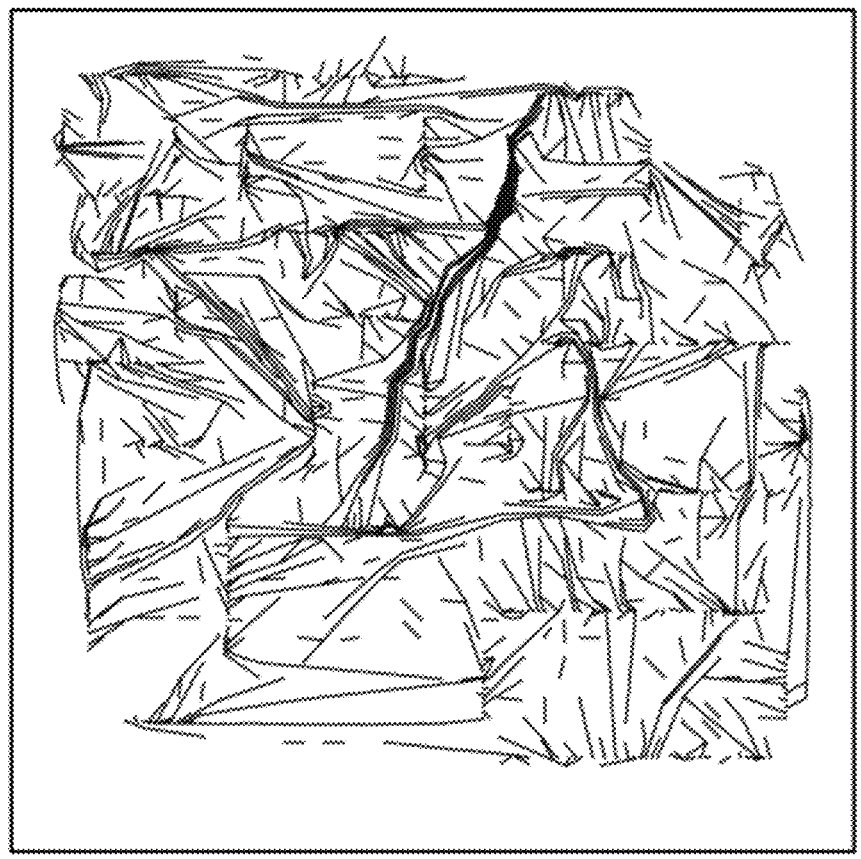
FIG. 14 illustrates layout of the first layer in dense 5.

As shown in Table III, the proposed algorithm achieves 100% routability in all benchmarks, while AARF* only achieves 100% routability in dense 1. For all cases, the proposed algorithm gives the shortest total wirelength compared with other algorithms. On average, the proposed algorithm gives a 15.7% wirelength reduction than Cai. This shows the effectiveness of the invention and the potential of any non-acute angle routing. The reasons why the proposed any non-acute angle routing flow can achieve significantly better routability and wirelength with a reasonable runtime overhead are analyzed as follows:

AARF greedily uses the total routing resource without reserving for the subsequent routes. The greedy strategy reduces the routability in the congestion region. In contrast, our algorithm results in better routability in the congestion region, as shown in the right part of FIG. 14.

In a sparse region, the proposed any non-acute angle router adjusts the access points and connects the routes close to long segments, unlike the traditional RDL routers that tend to generate fragmented detoured segments.

The invention's contributions are summarized as follows:

(1) The invention is the first work to solve the any non-acute angle RDL routing problem with multiple RDLs.

(2) The invention proposes a capacity estimation method and a refinement process for routing guide generation after DT, which gives a higher utilization rate in the congestion region.

(3) The invention extends the dynamic programming-based access point adjustment in the previous work, making it work for multiple nets simultaneously.

(4) The invention proposes a tile routing algorithm to perform legalization and optimization in a tile.

(5) Experimental results show that the proposed algorithm can achieve higher routability than the state-of-the-art any angle router and an average of 15.7% shorter wirelength than the state-of-the-art RDL router.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A non-transitory computer-readable medium containing instructions, which when read and executed by a computer, cause the computer to execute a method for routing of redistribution layers in IC package, wherein the method comprises steps of:

performing a routing graph construction to generate candidate vias for connections in different wire layers;

performing a net order determination to find routing resource from triangular tiles, wherein said routing resource includes a plurality of nets sorted by estimated congestion through estimated guides of candidate vias nodes;

performing a routing guide construction to obtain routing guides of said plurality of nets;

performing an access point adjustment such that a movable range of each said plurality of access points is small enough, or said plurality of access points are moved, wherein an access point represents an actual position that a net intersects with tile edges; and performing a tile routing such that said plurality of access points to be connected are all paired and located on tile boundaries.

2. The non-transitory computer-readable medium of claim 1, wherein a via planning algorithm is adopted to generate said candidate vias for connections in different wire layers.

3. The non-transitory computer-readable medium of claim 2, wherein said candidate vias include candidate upward vias and candidate downward vias.

4. The non-transitory computer-readable medium of claim 3, wherein said candidate vias are distributed averagely by user-defined parameter and input location.

5. The non-transitory computer-readable medium of claim 4, wherein a fixed number of dummy points are uniformly inserted into said tile boundaries.

6. The non-transitory computer-readable medium of claim 5, wherein said routing resource includes routing graph composed of two kinds of search nodes, via nodes and edge nodes, and three kinds of edges, cross-via edges, access-via edges and cross-tile edges.

7. The non-transitory computer-readable medium of claim 1, wherein said net order determination includes a net order adjustment according to failure count of said plurality of nets.

8. The non-transitory computer-readable medium of claim 1, wherein said plurality of access points are classified as fixed access points and movable access points.

9. The non-transitory computer-readable medium of claim 1, wherein a user-defined number of candidate positions are evenly distributed into said movable range of each said plurality of access points in said access point adjustment.

10. The non-transitory computer-readable medium of claim 1, wherein a routing angle for redistribution layers is larger than or equal to 90 degrees.

11. A method for routing of redistribution layers in IC package, which is executed by a computer, the method comprising:
using the computer to perform the following:
performing a routing graph construction to generate candidate vias for connections in different wire layers;
performing a net order determination to find routing resource from triangular tiles, wherein said routing resource includes a plurality of nets sorted by estimated congestion through estimated guides of candidate vias nodes;
performing a routing guide construction to obtain routing guides of said plurality of nets;
performing an access point adjustment such that a movable range of each said plurality of access points is small enough, or said plurality of access points are moved, wherein an access point represents an actual position that a net intersects with tile edges; and
performing a tile routing such that said plurality of access points to be connected are all paired and located on tile boundaries.

12. The method of claim 11, where a via planning algorithm is adopted to generate said candidate vias for connections in different wire layers.

13. The method of claim 12, wherein said candidate vias include candidate upward vias and candidate downward vias.

14. The method of claim 13, wherein said candidate vias are distributed averagely by user-defined parameter and input location.

15. The method of claim 14, wherein a fixed number of dummy points are uniformly inserted into said tile boundaries.

16. The method of claim 15, wherein said routing resource includes routing graph composed of two kinds of search nodes, via nodes and edge nodes, and three kinds of edges, cross-via edges, access-via edges and cross-tile edges.

17. The method of claim 11, wherein said net order determination includes a net order adjustment according to failure count of said plurality of nets.

18. The method of claim 11, wherein said plurality of access points are classified as fixed access points and movable access points.

19. The method of claim 11, wherein a user-defined number of candidate positions are evenly distributed into said movable range of each said plurality of access points in said access point adjustment.

20. The method of claim 11, wherein a routing angle for redistribution layers is larger than or equal to 90 degrees.

* * * * *